United States Patent
Murakami et al.

(10) Patent No.: US 9,612,353 B2
(45) Date of Patent: Apr. 4, 2017

(54) DETECTION DEVICE, ENERGY RECEIVER, ENERGY TRANSMITTER, POWER TRANSMISSION SYSTEM, AND DETECTION METHOD

(75) Inventors: Tomomichi Murakami, Tokyo (JP); Hiroaki Nakano, Tokyo (JP); Takaaki Hashiguchi, Tokyo (JP); Yoshitaka Yoshino, Tokyo (JP); Shinji Komiyama, Saitama (JP); Osamu Kozakai, Kanagawa (JP); Shinichi Fukuda, Kanagawa (JP); Yuji Murayama, Tokyo (JP); Keigo Bunsen, Tokyo (JP)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 14/233,043

(22) PCT Filed: Jul. 17, 2012

(86) PCT No.: PCT/JP2012/068549
§ 371 (c)(1),
(2), (4) Date: Jan. 15, 2014

(87) PCT Pub. No.: WO2013/012088
PCT Pub. Date: Jan. 24, 2013

(65) Prior Publication Data
US 2014/0159503 A1 Jun. 12, 2014

(30) Foreign Application Priority Data

Jul. 21, 2011 (JP) ................................. 2011-160186

(51) Int. Cl.
*G01V 3/06* (2006.01)
*H01F 38/14* (2006.01)
*H02J 17/00* (2006.01)
*G01V 3/08* (2006.01)

(52) U.S. Cl.
CPC .................. *G01V 3/06* (2013.01); *G01V 3/08* (2013.01); *H01F 38/14* (2013.01); *H02J 17/00* (2013.01)

(58) Field of Classification Search
CPC ....................................................... H02J 5/005
USPC ....................................................... 307/104
See application file for complete search history.

(56) References Cited

U.S. PATENT DOCUMENTS

2012/0161533 A1* 6/2012 Urano ..................... H02J 17/00
307/104

FOREIGN PATENT DOCUMENTS

JP 4413236 2/2010

* cited by examiner

*Primary Examiner* — Robert Deberadinis
(74) *Attorney, Agent, or Firm* — Chip Law Group

(57) ABSTRACT

A detection device includes a coil configured to be electromagnetically coupled with an outside, and a detection section connected to a circuit including the coil. The detection section is configured to measure a Q value of the circuit using an alternating-current signal at a frequency different from a frequency of an alternating-current signal of contactless power feed.

19 Claims, 12 Drawing Sheets

DETECTION DEVICE, ENERGY RECEIVER, ENERGY TRANSMITTER, POWER TRANSMISSION SYSTEM, AND DETECTION METHOD

TECHNICAL FIELD

The present disclosure relates to a detection device that detects the existence of a conductor such as metal, if any, and to a power reception device, a power transmission device, a contactless power transmission system, and a detection method. In particular, the present disclosure relates to an energy receiver, a detection method, a power transmission system, a detection device, and an energy transmitter.

BACKGROUND ART

With contactless power transmission, detecting a conductor such as metal or a circuit including a coil near power transmission/reception coils, if any, is very important for power charge with high safety and efficiency.

Using a combination of power transmission and reception devices, any metal substance inserted between the power transmission device (power transmission coil) and the power reception device (power reception coil) has been previously detected based on information about amplitude and phase at the time when the power reception device shows a change of load (for example, see PTL1). Any metal substance has also been detected based on a change of power transmission/reception efficiency (also referred to as coil-to-coil efficiency), or based on a change of sensor output using a magnetic sensor, a capacitive sensor, an infrared sensor, or others.

CITATION LIST

Patent Literature

[PTL1]: Japanese Patent No. 4413236 (Japanese Unexamined Patent Application Publication No. 2008-206231)

SUMMARY OF INVENTION

With such approaches to detect any metal substance using a combination of power transmission and reception devices based on information about amplitude and phase at the time when the power reception device (secondary side) shows a change of load, or to detect any metal substance based on a change of power transmission/reception efficiency, however, the power transmission and reception devices are expected to be in communication with each other for the detection of metal substances. For example, if signals generated between the coil of the power transmission device and a proper power reception device that is now non-communicable due to a metal substance being not a power reception circuit are generated in the coil of the power transmission device, the metal substance is not detected. Moreover, the detection results greatly vary and lack precision due to the dependence on the degree of electromagnetic coupling between the power transmission device (power transmission coil) and the power reception device (power reception coil), and on the frequency of carrier signals.

With the approach to detect any metal substance using a magnetic sensor, a capacitive sensor, an infrared sensor, or others, the power transmission and reception devices are respectively expected to have sensors in addition to the power transmission and reception coils. This puts design restrictions on the device chassis, and causes a disadvantage in terms of cost.

It is thus desirable to enable detection of metal foreign substance with high precision even during power feed.

According to an embodiment of the present disclosure, there is provided an energy receiver including: a power reception coil configured to receive power from a power transmission coil using a first alternating-current signal having a first frequency; and a Q-value measurement circuit configured to detect a foreign object within a range of the power reception coil using a second alternating-current signal having a second frequency that is different than the first frequency.

According to an embodiment of the present disclosure, there is provided a detection method including: transmitting power from a power transmission coil to a power reception coil using a first alternating-current signal having a first frequency; and detecting a foreign object within a range of the power reception coil using a second alternating-current signal having a second frequency that is different than the first frequency.

According to an embodiment of the present disclosure, there is provided a power transmission system including: a power transmitter configured to wirelessly couple with a power receiver and transmit power to the power receiver using a first alternating-current signal having a first frequency; and a Q-value measurement circuit configured to detect a foreign object between the power transmitter and the power receiver using a second alternating-current signal having a second frequency that is different than the first frequency.

According to an embodiment of the present disclosure, there is provided an energy transmitter including: a power transmission coil configured to wirelessly transmit power to a power receiver using a first alternating-current signal having a first frequency; and a detection section configured to detect a foreign object within a range of the power transmission coil using a second alternating-current signal having a second frequency that is different than the first frequency.

According to an embodiment of the present disclosure, there is provided a detection device including: a detection section connected to a circuit including a coil, the detection section configured to detect a state of electromagnetic coupling to the coil.

According to one embodiment of the present disclosure, there is provided a detection device including a coil being electromagnetically coupled with an outside, and a detection section being connected to a circuit including the coil, the detection section measuring a Q value of the circuit using an alternating-current signal at a frequency different from a frequency of an alternating-current signal of contactless power feed.

As an example, the above-described coil for the Q-value measurement is provided separately from a coil for power feed.

According to one embodiment of the present disclosure, there is provided a power reception device including a power reception coil being in power reception from an outside, a power reception section receiving an alternating-current signal via the power reception coil, a coil being electromagnetically coupled with an outside, and a detection section being connected to a circuit including the coil, the detection section measuring a Q value of the circuit using an alternating-current signal at a frequency different from a frequency of an alternating-current signal received by the power reception section.

According to one embodiment of the present disclosure, there is provided a power transmission device including a power transmission coil being used in contactless power transmission, a power transmission section supplying an alternating-current signal to the power transmission coil, a coil being electromagnetically coupled with an outside, and a detection section being connected to a circuit including the coil, the detection section measuring a Q value of the circuit using an alternating-current signal at a frequency different from a frequency of the alternating-current signal provided by the power transmission section.

According to one embodiment of the present disclosure, there is provided a contactless power transmission system including a power transmission device transmitting power wirelessly, and a power reception device receiving the power from the power transmission device. The power transmission device or the power reception device, or both include a feeding coil being used in contactless power feed, a coil being electromagnetically coupled with an outside, and a detection section being connected to a circuit including the coil, the detection section measuring a Q value of the circuit using an alternating-current signal at a frequency different from a frequency of an alternating-current signal flowing to the feeding coil.

According to one embodiment of the present disclosure, there is provided a detection method including measuring, with a detection section connected to a circuit including a coil electromagnetically coupled with an outside, a Q value of the circuit using an alternating-current signal at a frequency different from a frequency of an alternating-current signal flowing to a feeding coil.

According to the above-described example embodiments of the present disclosure, by using an AC signal at a frequency different from that of an AC signal flowing through the feeding coil, the AC signal for power feed is distinguished from the AC signal for Q-value measurement so that the Q-value measurement is allowed to be performed during power feed.

According to the above-described example embodiments of the present disclosure, detection of a metal foreign substance is performed with high precision even during power feed.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DESCRIPTION OF EMBODIMENTS

Figure 1:
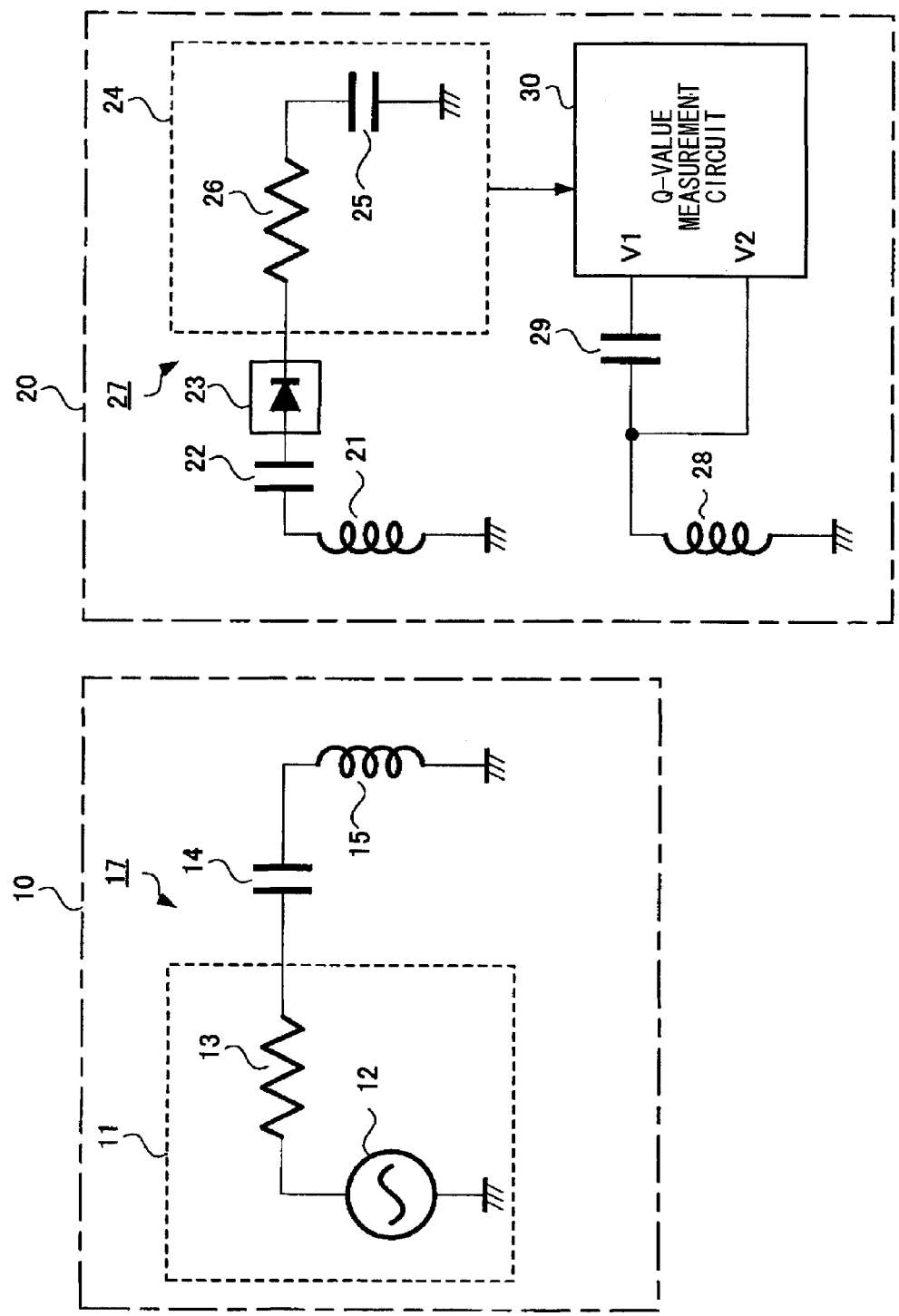
FIG. 1 is a schematic diagram showing a configuration of a contactless power transmission system according to a first embodiment of the present disclosure.

In the below, embodiments of the present disclosure are described by referring to the accompanying drawings. In the description and drawings, any components sharing substantially the same function or configuration are provided with the same reference numeral, and are not described twice.

The description is given in the following order.
1. First Embodiment (Example in which a Q-value measurement coil and a power reception coil are separately provided)
2. Second Embodiment (Example in which a power reception coil is provided with a tap)
3. Third Embodiment (Example in which a Q-value measurement coil is used commonly as a power reception coil)
4. Others (Other exemplary Q-value measurement)

An embodiment of the present disclosure is characterized in varying the frequencies of an AC signal for the use of power feed and for the use of Q-value measurement at the time of detection of a metal foreign substance existing between the power-transmission side (primary side) and the power-reception side (secondary side) using a Q-value change in a coil.

Herein, the metal foreign substance denotes a conductor such as metal or a circuit including a coil, which exists between the power-transmission and power-reception sides. The conductor in this description means a conductor in a broad sense, that is, includes a semiconductor. Hereinafter, detecting a conductor such as metal or a circuit including a coil is referred to also as "detecting a conductor or others".

The Q value of a resonant circuit including a coil is an index representing the relationship between energy retention and loss (resonance strength of the resonant circuit). If there is anything, e.g., a metal substance, near a power transmission coil on the power-transmission side or a power reception coil on the power-reception side, magnetic lines of force pass through the metal substance, thereby generating an eddy current in the metal substance. Drawing attention to the coil, this looks like the coil is with the actual resistive load through electromagnetic coupling between the metal substance and the coil so that the Q value of the coil is changed. By measuring the change of the Q value as such, the metal substance (in a state of electromagnetic coupling) existing near the coil is detected. The electromagnetic coupling is referred also to as "electromagnetic resonant coupling" or "electromagnetic resonance". The electromagnetic coupling includes electric field coupling and magnetic field coupling, both of which utilize resonance for power transmission only to a resonating device through electric field coupling or magnetic field coupling.

1. First Embodiment

Overview of Contactless Power Transmission System

In a first embodiment (hereinafter, referred to also as "this embodiment"), described first is an example in which a feeding coil and a Q-value measurement coil are separately provided.

FIG. 1 shows the overview of a contactless power transmission system including a Q-value measurement circuit 30 for Q-value measurement. The contactless power transmission system in this embodiment is configured to include a power transmission device 10 (an exemplary detection device), and a power reception device 20 (another exemplary detection device) including a Q-value measurement coil 28.

The power transmission device 10 is provided with a signal source 11, a capacitor 14, and a power transmission coil 15 (primary-side coil). The signal source 11 includes an AC power supply 12 generating AC signals, and a resistance element 13.

The resistance element 13 is the graphical indication of the internal resistance (output impedance) in the AC power supply 12. In this embodiment, the signal source 11 is connected with the capacitor 14 and the power transmission coil 15 to form a series resonant circuit. A capacitance value (C value) of the capacitor 14 and an inductance value (L value) of the power transmission coil 15 are adjusted to achieve resonance at any frequency for power feed. A power transmission section 17 configured to include the signal source 11 and the capacitor 14 contactlessly transmits power (performs power transmission) to the outside through the power transmission coil 15.

The power reception device 20 is provided with a power charge section 24, a rectifier section 23, a power reception coil 21 (secondary-side coil), and a capacitor 22. The power charge section 24 includes a capacitor 25 (or a secondary battery), and a resistance element 26. The rectifier section 23 converts AC signals to direct-current (DC) signals. The capacitor 22 configures a resonant circuit with the power reception coil 21. The power reception device 20 is also provided with the Q-value measurement coil 28, a capacitor 29, and the Q-value measurement circuit 30 (an exemplary detection section). The capacitor 29 configures a resonant circuit with the Q-value measurement coil 28.

The resistance element 26 is the graphical indication of the internal resistance (output impedance) in the capacitor 25. In this embodiment, the power charge section 24 is connected with the capacitor 22 and the power reception coil 21 to form a series resonant circuit. A capacitance value (C value) of the capacitor 22 and an inductance value (L value) of the power reception coil 21 are adjusted to achieve resonance at any frequency for power feed.

Similarly, the capacitor 29 and the Q-value measurement coil 28 are connected together to form a series resonant circuit, and the capacitance value (C value) of the capacitor 29 and an inductance value (L value) of the Q-value measurement coil 28 are adjusted to achieve resonance at a frequency for Q-value measurement. The series resonant circuit formed as such is connected with the Q-value measurement circuit 30. A power reception section 27 configured to include the power charge section 24, the rectifier section 23, and the capacitor 22 receives a contactless power supply (power reception) from the outside through the power reception coil 21. The power fed to the power charge section 24 as such is provided to the Q-value measurement circuit 30.

The Q-value of the series resonant circuit is expressed by Expression (1), where V1 denotes a voltage between the Q-value measurement coil 28 and the capacitor 29 configuring the series resonant circuit, and V2 denotes a voltage of the Q-value measurement coil 28 at both ends.

$$Q = \frac{V2}{V1} = \frac{2\pi fL}{r_s} = \frac{1}{r_s}\sqrt{\frac{L}{C}} \qquad (1)$$

rs: effective resistance value at frequency f

Q-times of the voltage V1 is the voltage V2. When a metal substance comes near the Q-value measurement coil 28, the effective resistance value rs is increased and the Q-value is decreased. As such, when a metal substance comes near the Q-value measurement coil 28, the measured Q-value (in the state of electromagnetic coupling) shows a change. Therefore, by detecting the change, the metal substance existing near the Q-value measurement coil 28 is detected.

Herein, because the example in FIG. 1 is of the basic circuit provided with the series resonant circuit, the circuit may take various other forms of detailed structure as long as with the functions of the circuit described above. For example, FIG. 1 shows the capacitor (secondary battery) as an exemplary load provided to the power reception device 20, but this is not restrictive.

Alternatively, the power reception device 20 may be provided with the signal source 11, and contactless power transmission may be performed to an external device through the power reception coil 21, or the power transmission device 10 may be provided with the load, and a contactless power supply may be provided from the external device through the power transmission coil 15.

(Description about Q-Value Measurement Circuit)

Figure 2:
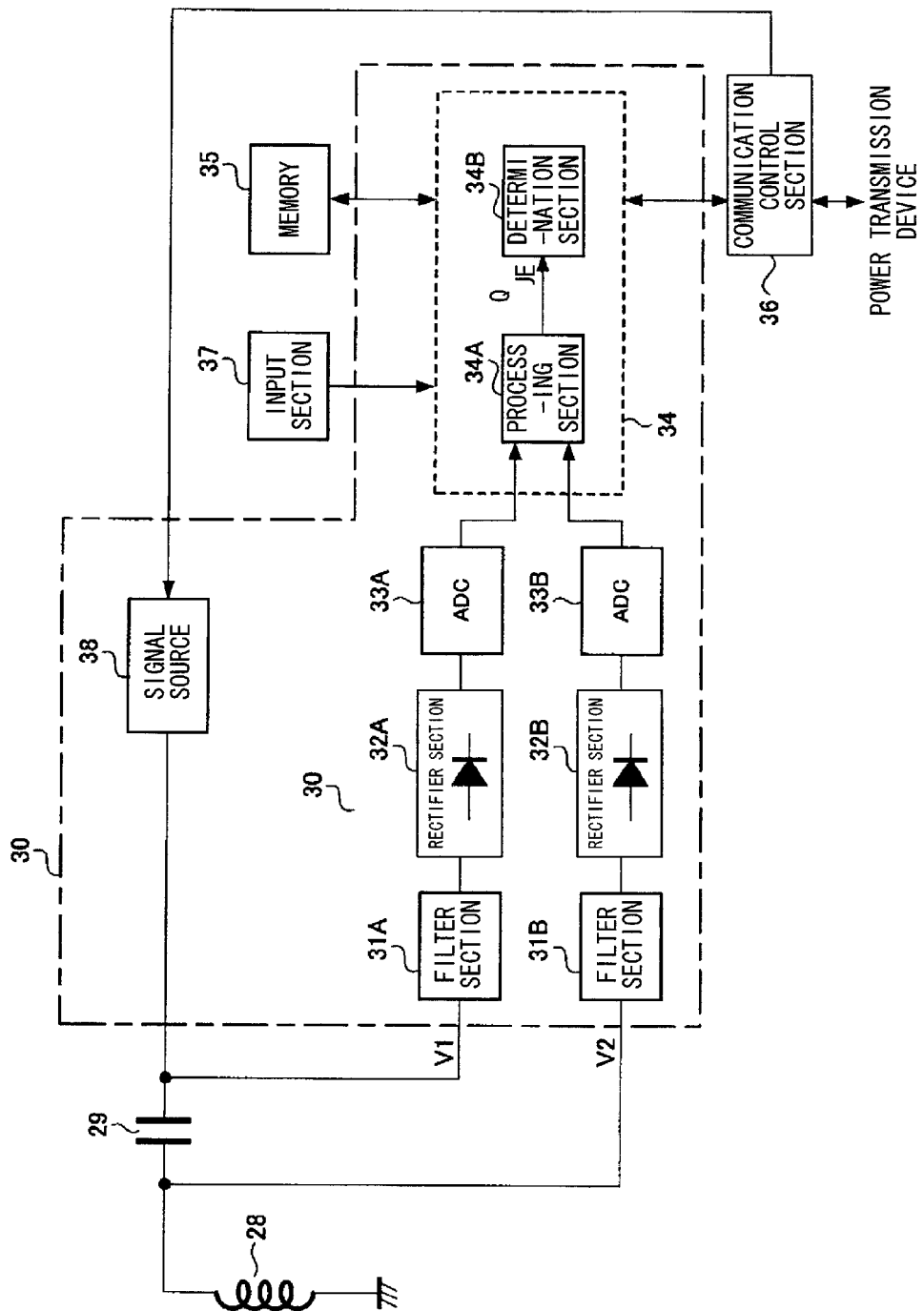
FIG. 2 is a block diagram showing an exemplary configuration of a Q-value measurement circuit 30 provided to a power reception device according to the first embodiment of the present disclosure.

FIG. 2 is a block diagram showing an exemplary configuration of the Q-value measurement circuit 30 provided to the power reception device 20 in the first embodiment.

Using this Q-value measurement circuit 30, detection is performed for a conductor such as metal, or a circuit including a coil. The blocks configuring the power reception device 20 including the blocks in the Q-value measurement circuit 30 are operated by the power coming from the power charge section 24. The power reception device 20 provided with the Q-value measurement circuit 30 is an exemplary detection device detecting the state of electromagnetic coupling.

The Q-value measurement circuit 30 in this embodiment is an exemplary detection section, and is configured to include filter sections 31A and 31B, rectifier sections 32A and 32B, analog-digital converters (hereinafter, referred to as ADCs) 33A and 33B, and a main control section 34.

The filter section 31A is a filter circuit that removes any unwanted noise component at the time of Q-value measurement. The unwanted noise component includes any incoming weak feeding-frequency signal and the harmonics thereof, which are included in AC signals (AC voltage) coming from the portion between the Q-value measurement coil 28 and the capacitor 29. Similarly, the filter section 31B is also a filter circuit that removes any unwanted noise component at the time of Q-value measurement. The unwanted noise component to be removed thereby is included in AC signals (AC voltage) coming from the portion between a signal source 38 and the capacitor 29.

The rectifier sections 32A and 32B each convert a Q-value measurement AC signal into a DC signal (DC voltage), and outputs the DC signal. The Q-value measurement AC signal is the result of noise removal by each of the filter sections 31A and 31B.

The ADCs 33A and 33B each convert an analog DC signal coming from the corresponding rectifier section 32A or 32B into a digital DC signal, and output the digital DC signal to the main control section 34.

The main control section 34 is an exemplary control section, and is configured by an MPU (Micro-Processing Unit), for example. The main control section 34 performs control over the entire power reception device 20. This main control section 34 functions both as a processing section 34A, and a determination section 34B.

The processing section 34A is the block for predetermined processing, and in this embodiment, calculates a ratio between the voltages V1 and V2, i.e., Q-value, from the DC signals provided by the ADCs 33A and 33B, and then outputs the calculation result to the determination section 34B.

The determination section 34B compares the calculation result provided by the processing section 34A with a threshold value stored in a nonvolatile memory 35, and based on the comparison result, determines whether or not there is any conductor such as metal or any circuit including a coil in the vicinity. The threshold Q value (Ref_Q) is measured in advance in the state that there is nothing around or on the Q-value measurement coil 28, i.e., the power reception coil 21, and the resulting value is stored in the memory 35.

A communication control section 36 performs communications with a communication control section (not shown) which has the same function in the power transmission device 10. For example, the communication control section 36 communicates with the power transmission device 10 for negotiations before power feed, or during the power feed, sends out a signal to the power transmission device 10 in accordance with a command from the main control section 34, thereby controlling the signal source 11 in the power transmission device 10 to generate or stop generating the AC voltage. With this, the contactless power transmission is performed safely and satisfactorily between the power transmission 10 and the power reception device 20. The communication control section 36 also controls the signal source 38 to generate the AC signals at the time of Q-value measurement. Herein, the main control section 34 may issue a command directly to the signal source 38 not via the communication control section 36.

An input section 37 generates an input signal according to the user operation, and outputs the resulting input signal to the main control section 34.

In this embodiment, described is the configuration that the power reception device 20 includes therein the Q-value measurement circuit 30. However, alternatively, the Q-value measurement circuit 30 may be provided to either the power transmission device 10 or the power reception device 20, or to both of these devices.

Figure 3A:
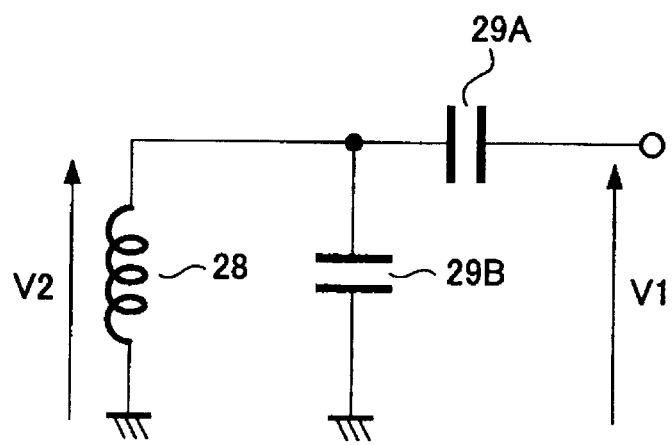
FIGS. 3A and 3B are each a circuit diagram of another exemplary resonant circuit.
Figure 3B:
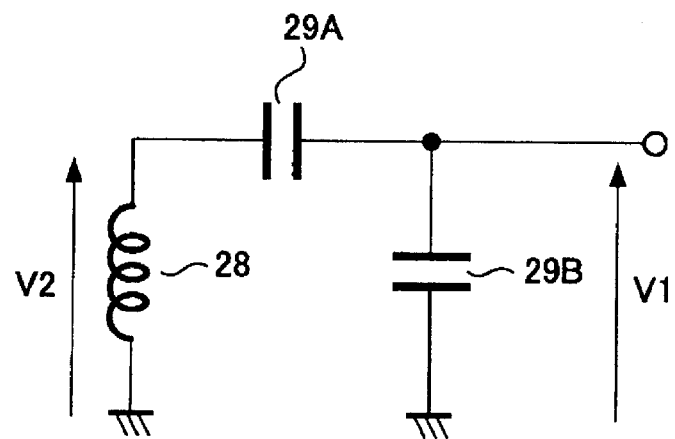

Also, in this embodiment, described is the application example of connecting the Q-value measurement circuit 30 to the series resonant circuit, but any other resonant circuits may be also used as the resonant circuit. FIGS. 3A and 3B each show an exemplary resonant circuit.

In an example in FIG. 3A, a capacitor 29A is connected in series to a parallel resonant circuit including a capacitor 29B and the Q-value measurement coil 28, thereby configuring a resonant circuit.

In FIG. 3B example, a capacitor 28B is connected in parallel to a series resonant circuit including a capacitor 29A and the Q-value measurement coil 28, thereby configuring a resonant circuit. The Q-value measurement circuit 30 calculates the Q value using the voltages V1 and V2 obtained in the resonant circuits of FIGS. 3A and 3B. The voltage V1 is a voltage between the Q-value measurement coil 28 and the capacitor 29B, and the voltage V2 is a voltage of the Q-value measurement coil 28 at both ends.

The series resonant circuit and other resonant circuits described above are only examples for describing the principle of the electromagnetic coupling detection method according to the embodiment of the present disclosure, and the configuration of the resonant circuit is not restricted thereto.

[Processing for Power Feed and Q-Value Measurement]

Described next is processing to control the entire contactless power transmission system according to the first embodiment of the present disclosure.

Figure 4:
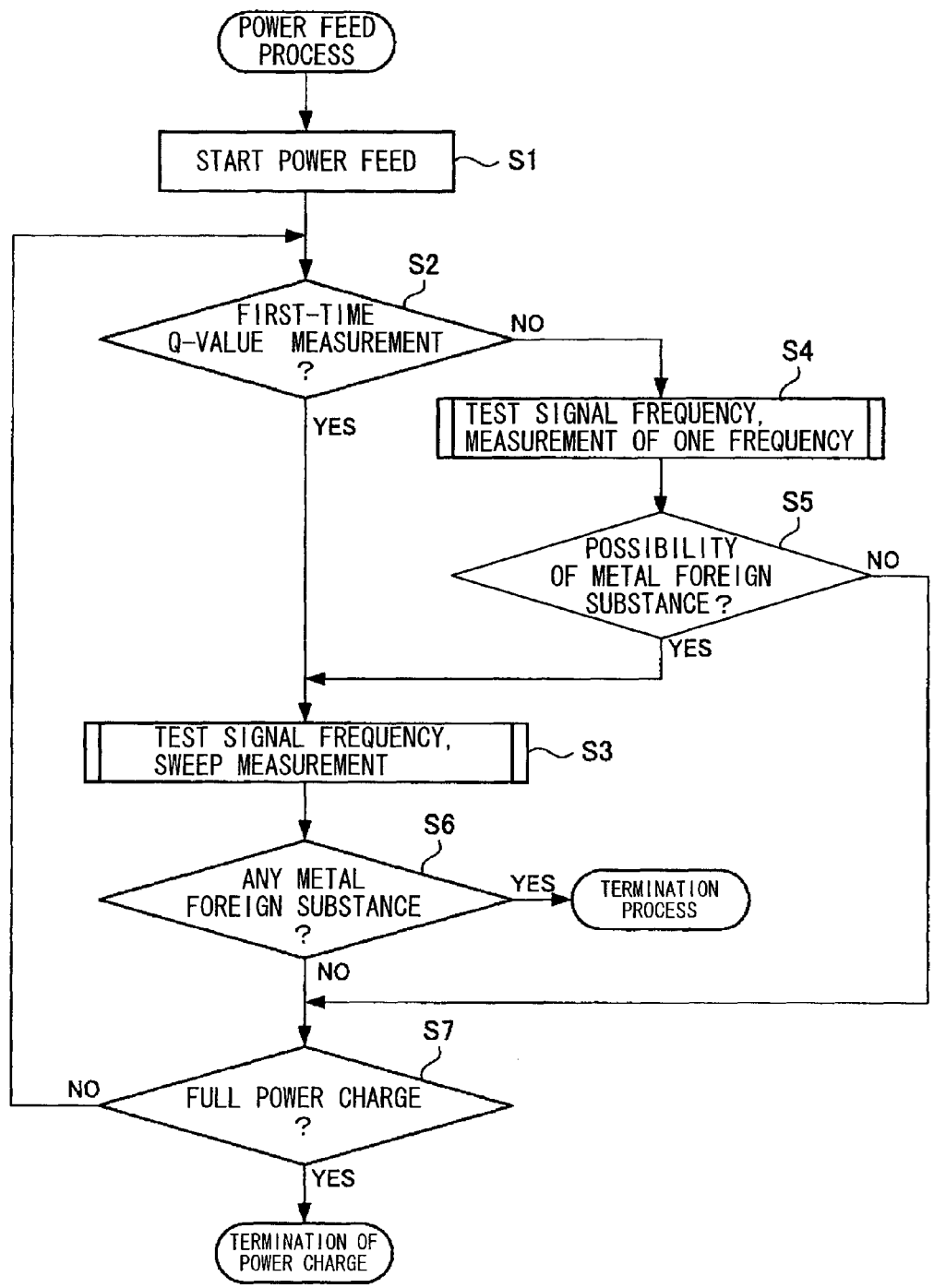
FIG. 4 is a flowchart of a process at the time of power feed of the contactless power transmission system according to the first embodiment of the present disclosure.

FIG. 4 is a flowchart of processing during power feed of the contactless power transmission system configured to include the power transmission device 10 and the power reception device 20.

First of all, the power transmission device 10 is activated, and then the power reception device 20 is disposed near the power transmission device 10. In response thereto, negotiations are performed between the main control section (not illustrated) in the power transmission device 10 and the main control section 34 in the power reception device 20. After the mutual recognition between the power transmission device 10 and the power reception device 20, the power feed is started from the power transmission device 10 to the power reception device 20 (step S1). The main control section in the power transmission device 10 or the power reception device 20 performs the Q-value measurement in the Q-value measurement coil when the power feed is started, and also makes a determination whether the Q-value measurement to be performed is the first-time measurement or not (step S2).

As an example, if it is immediately after the power transmission device 10 or the power reception device 20 is turned on, the main control sections of the device determine that the Q-value measurement to be performed is the first-time measurement. Or, as a result of the negotiations, if the power reception device 20 in communication with is found out as being the first-time communication partner based on ID information thereof (identification information), the power transmission device 10 determines that the Q-value measurement is the first-time measurement. Alternatively, at the time of negotiations, from the power reception device 20, the power transmission device 10 may be provided with the number of counts calculated by the power reception device 20 to keep track of the number of times the Q-value measurements is performed.

Still alternatively, the lapse of time from the last-time Q-value measurement may be used as a basis for the determination. The power transmission device 10 (and the power reception device 20) is provided with a clock section that is not illustrated, and at a time of a Q-value measurement, allows the measurement result of Q value to be correlated with the time of the measurement and to be stored in the memory. Thereafter, the power transmission device 10 (and the power reception device 20) compares the time of the last-time Q-value measurement with the time of the this-time Q-value measurement, and if a time difference therebetween exceeds a predetermined value, determines that the Q-value measurement is performed for the first time. As to the number of times the Q-value measurement is performed, for example, the Q-value measurement involving frequency sweep is assumed as being the first time, and with reference thereto, the number of times is counted. Alternatively, the timer function of the clock section may have been activated at the time of a previous Q-time measurement, and the lapse of time on the timer may be used as a basis for the determination.

When the power transmission device 10 determines that the Q-value measurement to be performed is the first-time measurement, the main control section 34 of the power reception device 20 uses a plurality of frequencies (sweep measurement) to a test signal (sine wave) provided by the signal source 38 for the measurement use, and from the resulting Q values, obtains the largest Q value (step S3). The frequency of the test signal with the largest Q value is stored in the memory 35.

For the Q-value measurement, the sine waves being the resonant frequency are expected to be input to the power reception device 20. The concern here is that the resonant frequency shows a change with any component variations or the environment around the secondary-side coil in the power reception device 20, the mixture of any metal foreign substance, and others. Therefore, a search of the resonant frequency is expected to be conducted by a measurement (frequency sweep) using various frequencies in some appropriate range (measurement range) with consideration of the resonant frequency drift. In the whole contactless power transmission system, such frequency sweep is a must for the first-time Q-value measurement, but may be skipped for the second-time measurement onward.

On the other hand, when the Q-value measurement in question is determined in step S2 not to be the first-time measurement, the power reception device 20 obtains a Q value using the test signal at the frequency found out in the first-time Q-value measurement (step S4).

Based on the resulting secondary-side Q value, the power transmission device 10 or the power reception device 20 then determines the possibility of the existence of any metal foreign substance (step S5). When there is no possibility that such a metal foreign substance exists, the procedure goes to step S7.

On the other hand, when the determination in step S5 is made that there is the possibility of any metal foreign substance, the procedure returns to step S3. In step S3, the main control section 34 of the power reception device 20 runs the frequency sweep to the test signal, and obtains the largest Q value from the resulting other Q values.

After the process in step S3, the main control section of the power transmission device 10 or the reception device 20 determines whether there is any metal foreign substance based on the calculation result of the secondary-side Q value (step S6). When the main control section determines that there is a metal foreign substance, the power feed is force-terminated or a user warning is issued as a termination process. As a forced process of power feed, the power transmission device 10 may stop power transmission, or the power reception device 20 may stop power reception even if the power comes from the power transmission device 10.

For the Q-value measurement in steps S3 to S6 described above, when the power reception device 20 is in charge thereof, the power provided by the power transmission device 10 is used therefor. Alternatively, the power in the capacitor or in the power storage section of a battery may be used, for example.

When the determination in step S6 is made that there is no metal foreign substance, the main control section 34 of the power reception device 20 determines whether a battery or others (load) that are not illustrated is fully charged or not (step S7). When the full charge is done, the charge process is ended by stopping the power transmission process by the power transmission device 10 or the power reception process by the power reception device 20. When the full charge is not yet done, the procedure returns to step S2, and the processes described above are repeated.

(Measurement Result)

Described next is the result of Q-value measurement when a metal substance is actually deposited near the Q-value measurement coil 28 of the power reception device 20.

Figure 5:
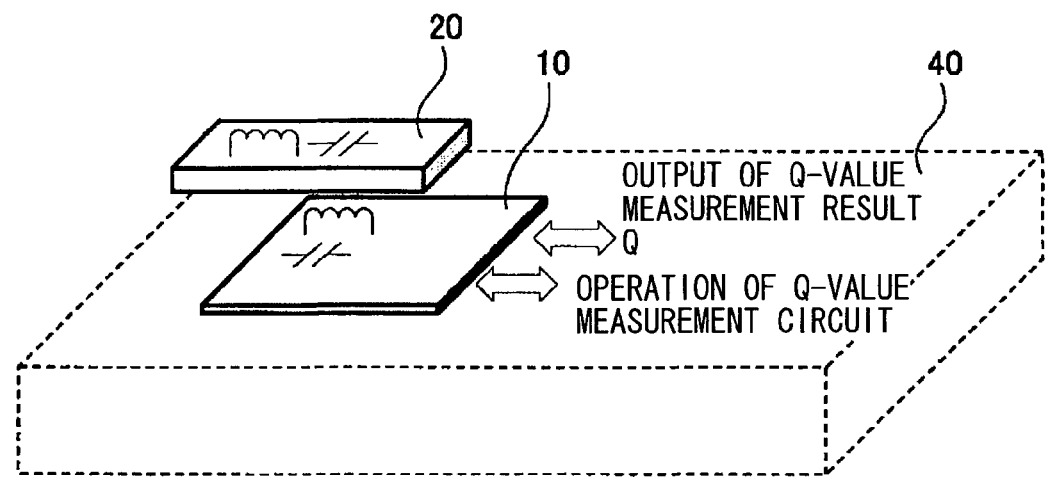
FIG. 5 is a diagram illustrating a method of conductor detection.
Figure 6:
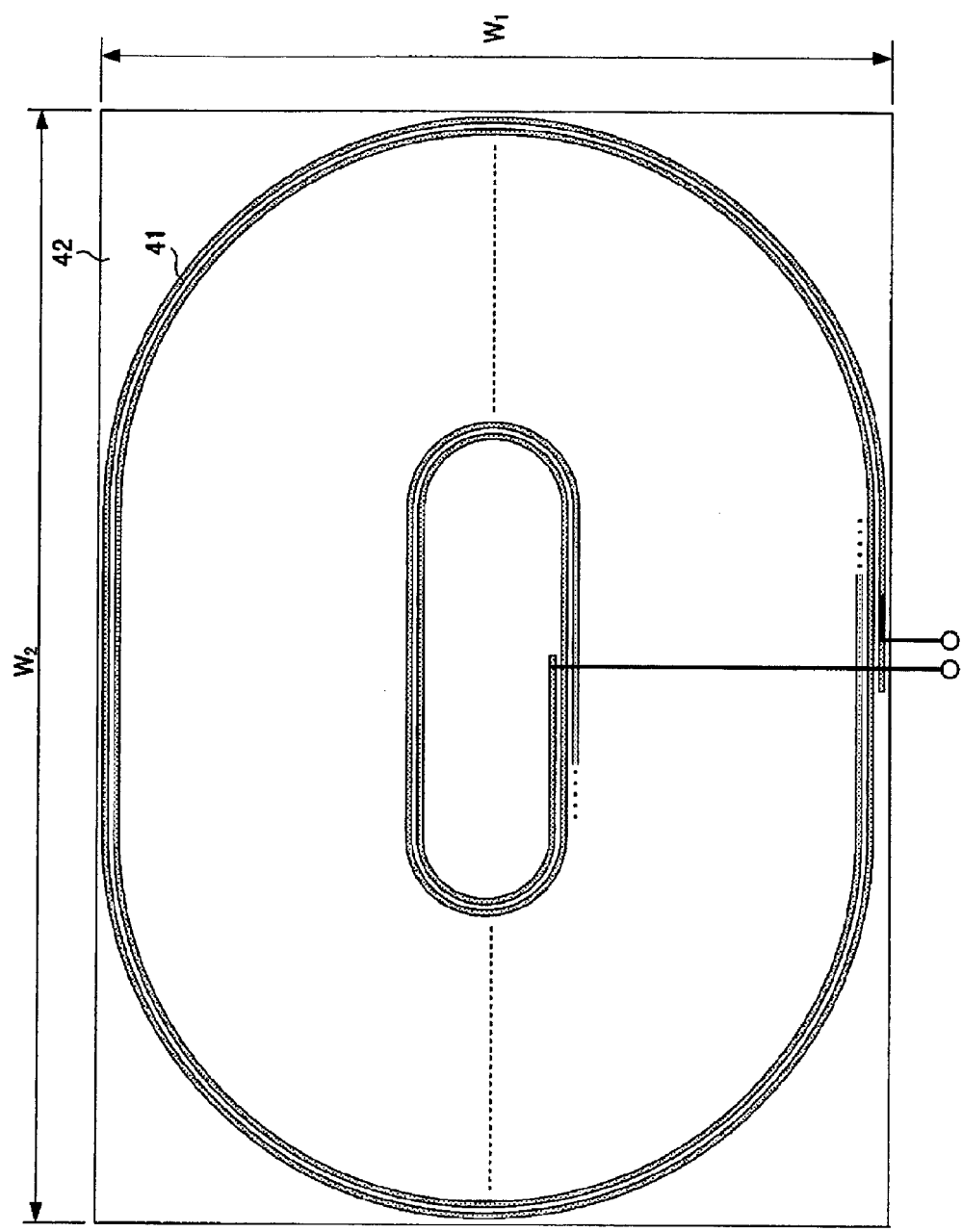
FIG. 6 is a schematic diagram showing an exemplary coil for use in power transmission and reception devices.

As shown in FIG. 5, for the measurement, the power transmission device 10 and the power reception device 20 on a base 40 are brought closer to each other, a metal substance is placed therebetween, and the Q-value measurement circuit 30 is operated. For this measurement, the power transmission coil 15 in use is a spiral coil of 150 mm (W1)×190 mm (W2) as shown in FIG. 6. This spiral coil is formed with a wound Litz wire 41 (wire diameter φ of 1.0 mm) which is a lead being a result of twisting a plurality of thin copper wires. On the underside of the spiral coil, a ferrite-made magnetic substance 42 with the thickness of 1.0 mm is laid. When there is no metal substance in the vicinity, the power transmission coil 15 has the L value of 192.0 μH, and the Q value of 230.7. The resonating capacitor 14 has the C value of 8.2 nF. In this case, the series resonant circuit including the power transmission coil 15 has the resonant frequency of 127.0 kHz.

The Q value of the resonant circuit is generally expressed by the relationship of $1/\{(1/Qc)+(1/QL)\}$, where Qc denotes the Q value of the capacitor, and $Q_L$ denotes the Q value of the coil. The Q value of the capacitor 14 used for this measurement is designed to be sufficiently higher than the Q value of the power transmission coil 15 so that the effect thereof over the Q value of the series resonant circuit is negligible. Alternatively, the Q value of the power transmission coil 15 may be designed to be sufficiently higher than the Q value of the capacitor 14, or these Q values may be of the same level.

The coil used as the power reception coil 21 is configured similarly to the coil of FIG. 6, and is a spiral coil with the coil size of 30 mm (W1)×50 mm (W2), being formed with the wound Litz wire 41 with the wire diameter φ of 0.65 mm. On the underside of this spiral coil, as an alternative to the magnetic substance 42, a ferrite-made magnetic sheet with the thickness of 0.2 mm is affixed. The power transmission coil has the L value of 14.0 μH, and the Q value of 48.4 when there is no power reception device 20 in the vicinity. The series resonant circuit including the power reception coil 21 has the resonant frequency of 127.0 kHz. Moreover, a coupling coefficient k is 0.10, which is the degree of electromagnetic coupling between the power transmission coil 15 and the power reception coil 21, and the coil-to-coil efficiency is 0.83. In this embodiment, the primary-side coil (the power transmission coil 15) is larger in size than the secondary-side coil (the power reception coil 21). This is not restrictive, and the coils may be of the same size, for example.

The coil-to-coil efficiency (theoretical maximum value) $\eta_{max}$ is known to be expressed by Expression (2) below.

$$\eta_{max} = \frac{S^2}{\left(1 + \sqrt{1+S^2}\right)^2}, \quad (2)$$

where S is expressed by Expressions (3) and (4) below.

$$S = kQ_{total} \quad (3)$$

$$Q_{total} = \sqrt{Q_1 Q_2} \quad (4)$$

In Expressions above, $Q_{total}$ denotes the Q value of the entire contactless power transmission system, $Q_1$ denotes the primary-side Q value, and $Q_2$ denotes the secondary-side Q value. To be specific, with magnetic field resonance, the coil-to-coil efficiency $\eta_{max}$ is theoretically uniquely obtained using the coupling coefficient k, and the primary-side Q value ($Q_1$) and the secondary-side Q value ($Q_2$). Herein, the coupling coefficient k is the degree of electromagnetic coupling between the primary- and secondary-side coils, and the Q values $Q_1$ and $Q_2$ are those of the resonant circuit under no load. Accordingly, even if the coupling coefficient k is small, as long as the Q values are high on the both sides of power transmission and reception, the power transmission is performed with high efficiency. Note herein that, however, this embodiment is surely not restrictive to those numeral values exemplarily described above.

Figure 7:
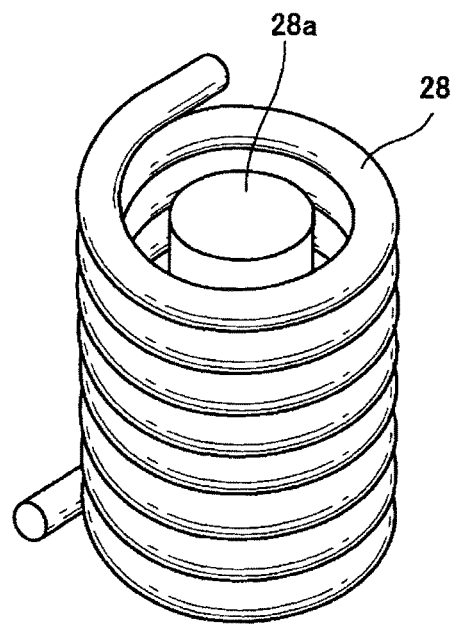
FIG. 7 is a schematic diagram showing an exemplary coil for use of Q-value measurement.

Aside from the power reception coil 21, the Q-value measurement coil 28 of FIG. 7 is provided with a ferrite-made core 28a with the diameter ϕ of 7 mm and the length of 6 mm. On the side surface thereof, a coil formed with a wound Litz wire with the wire diameter ϕ of 0.65 mm is provided. When the power transmission device 10 is not in the vicinity, the power reception coil 21 has the L value of 1.0 μH and the Q value of 47.2. The series resonant circuit including the Q-value measurement coil 28 has the resonant frequency of 1 MHz. The configuration of the Q-value measurement coil 28 including the core 28a is only an example, and is not restrictive.

To the series resonant circuit including such a Q-value measurement coil 28, a metal substance of iron (Fe) and that of aluminum (Al) are each brought closer. These metal substances each have the thickness of 1.0 mm. The distance between the power transmission coil 15 and each of the metal substances is fixed to be 8 mm by a spacer, for example. The Q-value measurement is then performed by the Q-value measurement circuit 30 of the power reception device 20 with various metal sizes.

Figure 8:
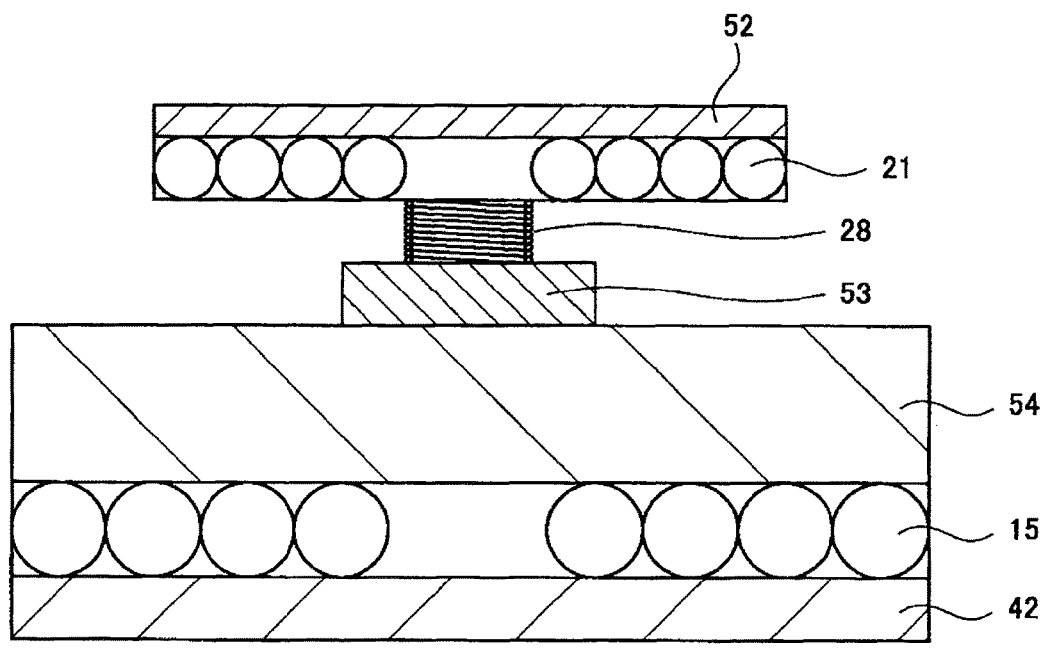
FIG. 8 is a schematic cross-sectional diagram showing a metal substance that is sandwiched between a power transmission coil, a power reception coil, and a Q-value measurement coil.

FIG. 8 is a schematic cross-sectional view of metal substance placed between the power transmission coil 15 and the power reception coil 21 in the measurement described above.

Between the power transmission coil 15 with the magnetic substance 42 on the underside thereof, and the power reception coil 21 with a magnetic sheet 52 affixed to the underside thereof, the Q-value measurement coil 28, a metal substance 53, and a spacer 54 are placed.

Figure 9:
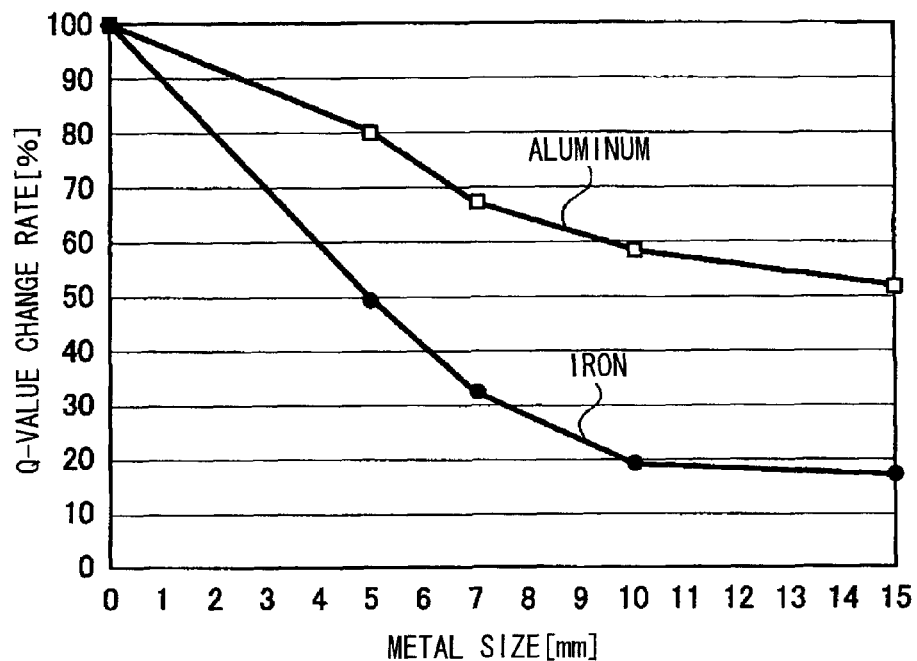
FIG. 9 is a graph showing various characteristics with respect to a metal size according to the first embodiment of the present disclosure.

FIG. 9 shows a characteristic graph of Q values with respect to the metal size. The graph of FIG. 9 shows Q values using the normalized rate of change when a Q value with no existence of metal substance (corresponding to the metal size of 0 mm) is 100%.

The measurement results using the metal substances of iron (Fe) and aluminum (Al) show that, as the metal substances are increased in size, the effective resistance values appear to be equivalently increased, and the Q values are decreased. To be specific, the larger metal substances mean the same as the shorter distance to the power transmission coil 15 if the metal substances are of the same size. The determination section 34B then compares the measurement results of Q values (or the rate of change of the Q values) with the threshold value stored in the memory 35 to see whether or not the Q values are in the threshold range, thereby determining the existence of the metal substances.

As such, based on the Q-value measurement results, any existence of a metal substance near the Q-value measurement coil 28 is detected. Although the degree of Q-value decrease shows a change with the metal material, the metal with a large degree of Q-value decrease easily produces heat. In other words, the Q values are associated with the heat-producing factor so that such easily-heated metal that is expected to be detected without fail is detected with more ease.

Described now is the reason of separately providing the feeding coil (the power reception coil 21) and the Q-value measurement coil (the Q-value measurement coil 28) in the method of detecting any metal substance using the Q values of the resonant circuit in this embodiment.

First of all, when the feeding frequency is the same, and when the feeding coil is the Q-value measurement coil, a high-power feeding signal is not subjected to filtering. As a result, the Q-value measurement circuit 30 may be damaged due to a high level of power on the driver output of the signal source 38, for example.

Moreover, if an attempt is made to perform the Q-value measurement in the opposing power transmission or reception coil during power feed, it means this measures the Q value of the resonant circuit under the loaded state, and this is not the measurement of the Q value that is originally supposed to be performed under no load (the Q value of the resonant circuit in the open state).

Therefore, with the method of detecting any metal foreign substance using the Q value of the resonant circuit, the Q-value measurement is not performed with high precision during the power feed.

Moreover, when the feeding coil and the Q-value measurement coil are not separately provided in the method of detecting any foreign substance using the Q value of the resonant circuit, for detection of any metal foreign substance with high sensitivity, the Q-value measurement is expected to be performed after the state of no load is created by stopping the power feed. Therefore, the power feed to the power reception side is expected to be stopped on a regular basis, and this leads to another expectation of controllably turning off the power supply of a power reception-side unit, or controllably switching the power feed from the battery of the power reception-side unit to the Q-value measurement circuit. This thus complicates the control flow of the power reception-side unit, or causes no-power-feed time from the power transmission to reception side, thereby resulting in a disadvantage of reducing the power feed efficiency per unit time.

Figure 10:
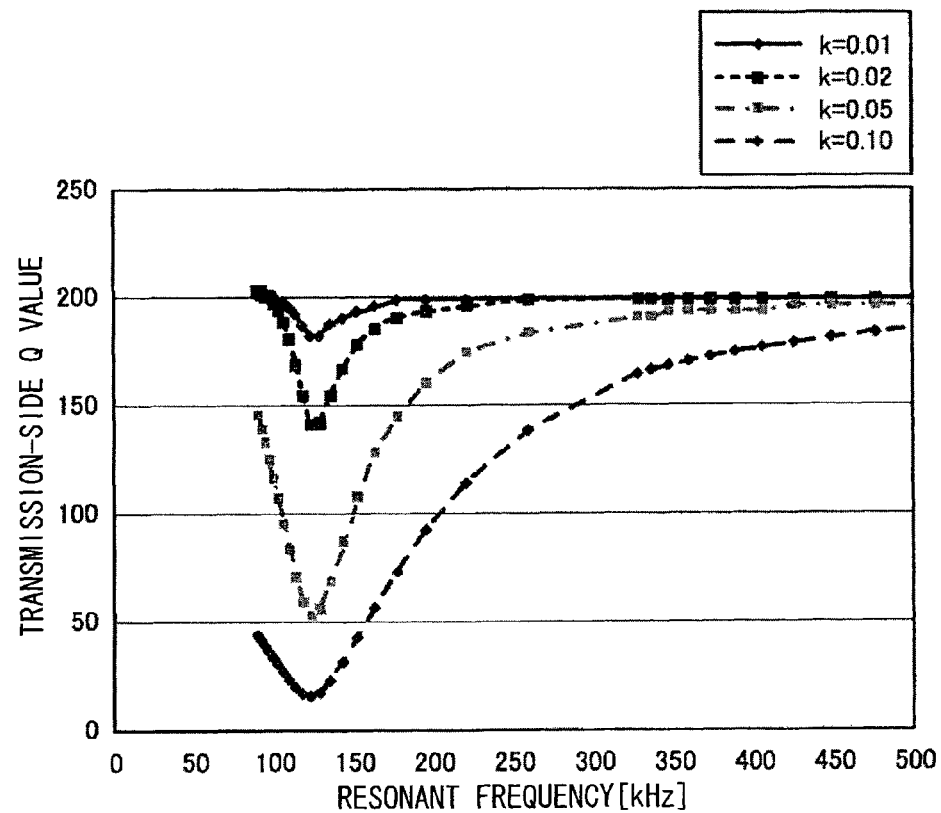
FIG. 10 is a graph showing the resonant frequency characteristics of a Q value on the power transmission side.

FIG. 10 shows the Q-value measurement results of a power transmission coil with various resonant frequencies.

The resonant frequency is varied with the capacitance value of a capacitor in a resonant circuit on the power reception side.

For the measurement, the power reception side is with the resistance load of 10Ω. The measurement results show that, as the resonant frequency of a resonant circuit including a power-reception coil approaches the resonant frequency of a resonant circuit including a power-transmission coil, the measured Q values show a decrease. Even if the measurement is performed with a different coupling coefficient k, the results seem to have similar tendencies.

This is because, due to the resonant frequencies being similar to each other in the resonant circuits respectively including the power transmission coil and the power reception coil, the electromagnetic coupling therebetween is enhanced, and this makes apparent the influence of the secondary-side load.

In order to get around such a disadvantage, the feeding coil and the Q-value measurement coil are separately provided with the aim of varying the resonant frequencies for the power feed and for the Q-value measurement. This allows filtering of a feeding signal and the Q-value measurement in the substantially no-load state. Because the Q-value measurement is performed during the power feed, the existence of a circuit including an arbitrary coil not outside the device itself but at least around the Q-value measurement coil is acknowledged.

According to this embodiment in the configuration as described above, the Q-value measurement is performed with high precision during power feed between the power transmission and reception sides.

With the Q-value measurement during the power feed as such, the control in the power-reception side becomes easy.

Further, the power feed is not stopped for the Q-value measurement, thereby improving the power feed efficiency per unit time.

Still further, the power feed is not stopped for the Q-value measurement means the power feed and the Q-value measurement are not expected to be in synchronization. Therefore, no signal is to be provided from the power transmission side to the power reception side to start or stop power transmission.

In the embodiment, described is the Q-value measurement mainly during the power feed. This is surely not restrictive, and the Q-value measurement is allowed to be performed not during the power feed. Moreover, described is the Q-value measurement coil 28 provided to the power reception device 20 to perform the Q-value measurement and determine the existence of a metal foreign substance. Alternatively, the Q-value measurement coil 28 may be provided to the power transmission device 10, or to both of the power transmission device 10 and the power reception device 20.

2. Second Embodiment

A second embodiment is an example in which the feeding coil in the first embodiment is provided with a tap.

Figure 11:
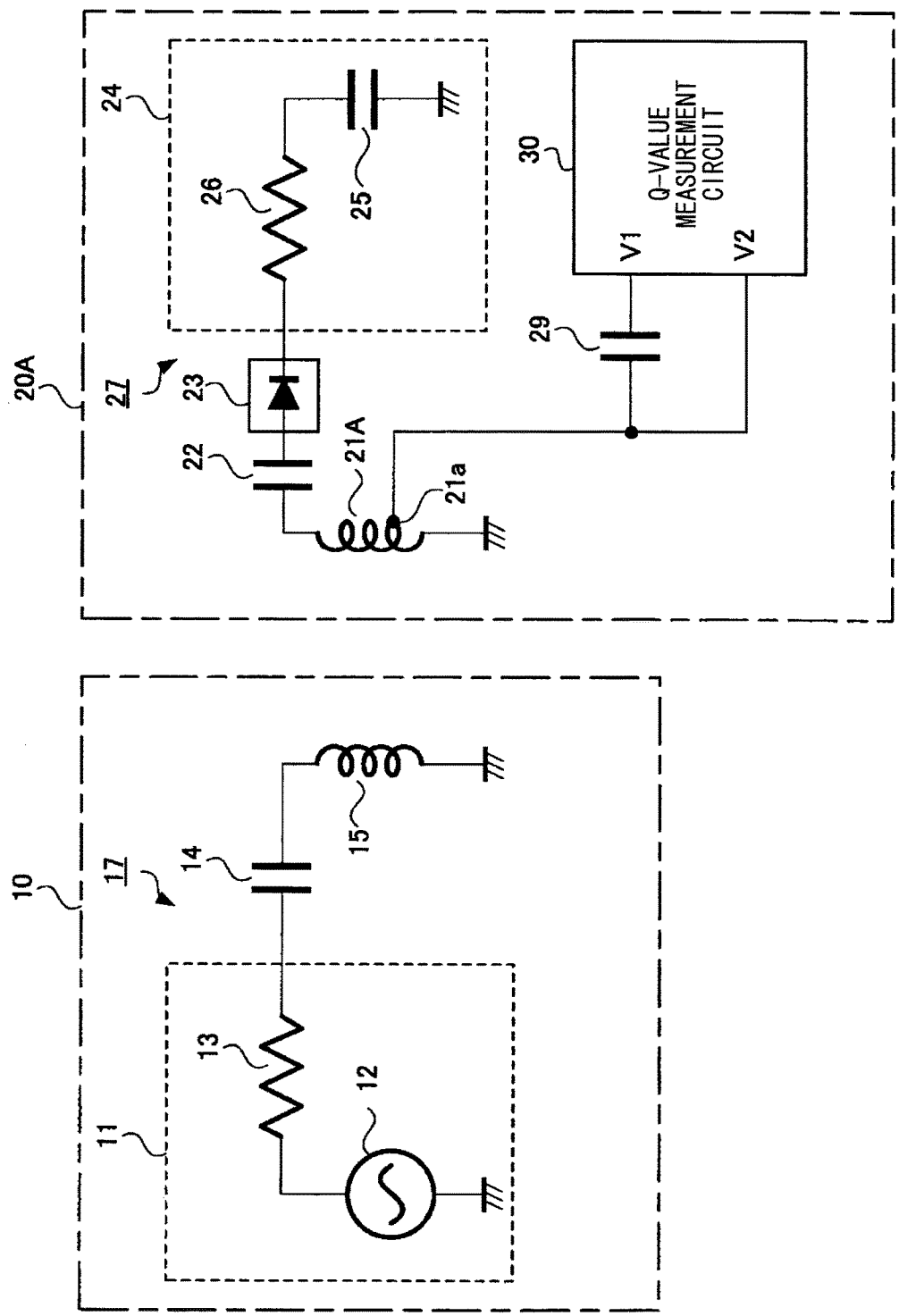
FIG. 11 is a schematic diagram showing the overall configuration of a contactless power transmission system according to a second embodiment of the present disclosure.

FIG. 11 shows the overall configuration of a contactless power transmission system according to the second embodiment of the present disclosure.

A power reception device 20A is provided with a power reception coil 21A provided with a tap 21a. The tap 21a is connected to an input terminal of the Q-value measurement circuit 30 via the capacitor 29 for measurement of the voltage V1. The tap 21a is also connected to an input terminal for measurement of the voltage V2.

As to a resonant circuit configured by the capacitor 29 and the coil portion of the power reception coil 21A, i.e., from the ground-side end portion thereof to the tap 21a, the resonant frequency thereof is changed to the resonant frequency during the power feed, and the Q-value measurement is performed using the changed resonant frequency.

According to the second embodiment, the resonant frequency is varied for the power feed and for the Q-value measurement using the tap-provided power reception coil. With such a configuration, the Q-value measurement coil that is not the power reception coil is not used.

As such, in addition to the effect achieved by the power reception device according to the first embodiment, the power reception device is allowed to be reduced in size.

Note that, in this second embodiment, the power reception coil 21A including the tap 21a is provided to the power reception device 20A to perform the Q-value measurement and determine the existent of a metal foreign substance. Alternatively, such a power reception coil 21A may be provided to the power transmission device 10, or to both of the power transmission device 10 and the power reception device 20.

3. Third Embodiment

In a third embodiment, unlike in the second embodiment in which the feeding coil is provided with the tap, a Q-value measurement coil is commonly used as a feeding coil.

Figure 12:
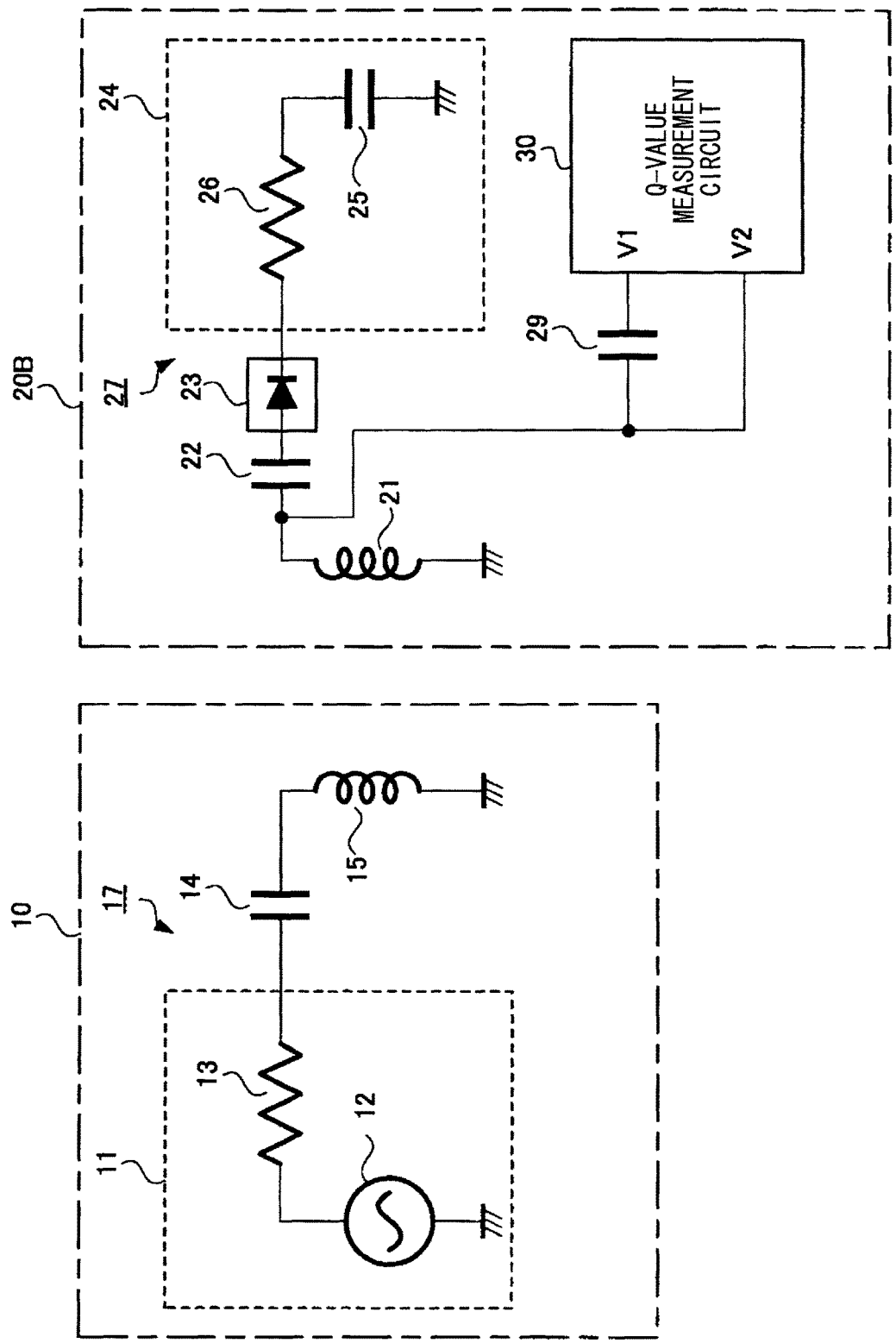
FIG. 12 is a schematic diagram showing the overall configuration of a contactless power transmission system according to a third embodiment of the present disclosure.

FIG. 12 shows the overall configuration of a contactless power transmission system according to the third embodiment of the present disclosure.

In a power reception device 20B, the Q-value measurement coil is commonly used as the feeding coil (the power reception coil 21), and the capacitor 22 of the resonant circuit for the power feed use is separately provided from the capacitor 29 of the resonant circuit for the Q-value measurement use. The end portion of the power reception coil 21 on the side opposite to the ground is connected to an input terminal of the Q-value measurement circuit 30 via the capacitor 29 for measurement of the voltage V1. The end portion of the power reception coil 21 on the side opposite to the ground is connected to an input terminal for measurement of the voltage V2.

With the capacitor 22 of the resonant circuit for the power feed use separately provided from the capacitor 29 of the resonant circuit for the Q-value measurement use, their capacitance values are different from each other. Accordingly, the Q-value measurement is performed with the frequency of the resonant circuit for the Q-value measurement use which is different from the feeding frequency of the resonant circuit for the power feed use but with the frequency of the resonant circuit for the Q-value measurement use.

According to the third embodiment, the Q-value measurement coil is commonly used as the feeding coil, and the capacitor of the resonant circuit for the power feed use is separately provided from the capacitor of the resonant circuit for the Q-value measurement use. With such a configuration, the resonant frequency varies for the power feed and for the Q-value measurement with different capacitance values. This eliminates the restriction to provide a Q-value measurement coil separately from a power reception coil. What is better, unlike in the second embodiment, the power reception coil is not provided with a tap.

As such, in addition to the effect achieved by the power reception devices according to the first and second embodiments, the power reception device is allowed to be further reduced in size.

Note that, in this third embodiment, the Q-value measurement coil is commonly used as the power reception coil in the power reception device 20B to perform the Q-value measurement and determine the existence of a metal foreign substance. Alternatively, the power transmission device 10, or both of the power transmission device 10 and the power reception device 20 may be configured similarly.

4. Others

[Modification 1 of Q-Value Measurement]

In the first to third embodiments, the processing section in the Q-value measurement circuit obtains the Q value using the voltage V1 between the Q-value measurement coil and the capacitor in the resonant circuit, and the voltage V2 of the Q-value measurement coil at both ends. Alternatively, the Q value may be obtained by the half-bandwidth method.

Figure 13:
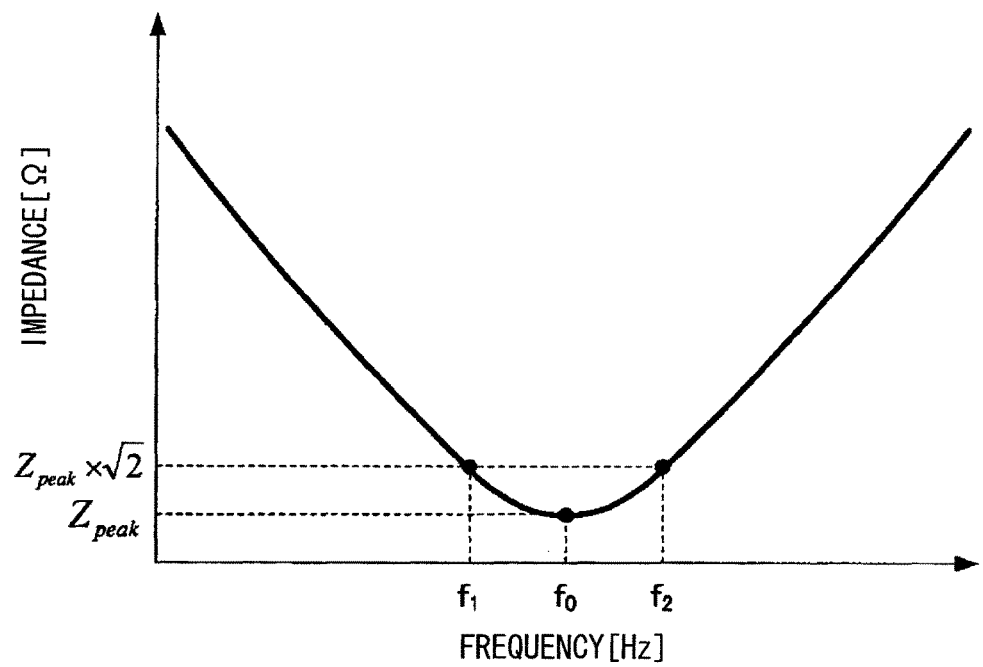
FIG. 13 is a graph showing the impedance frequency characteristics in a series resonant circuit.

With the half-bandwidth method, in a series resonant circuit, a Q value is obtained by Expression (5) with a band (frequencies f1 to f2) in which the impedance is √2 times of the absolute value of the impedance (Zpeak) at a resonant frequency f0 as shown in the graph of FIG. 13.

$$Q = \frac{f_0}{f_2 - f_1} \quad (5)$$

Figure 14:
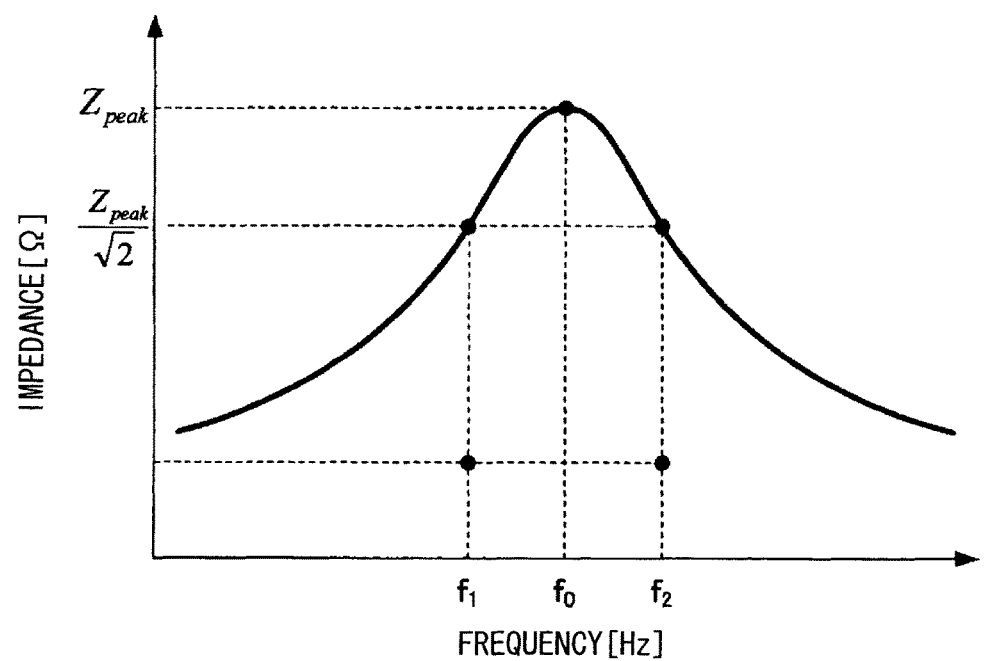
FIG. 14 is a graph showing the impedance frequency characteristics in a parallel resonant circuit.

Moreover, in a parallel resonant circuit, a Q value is obtained also by Expression (5) with a band (frequencies f1 to f2) in which the impedance is 1/√2 times of the absolute value of the impedance (Zpeak) at a resonant frequency f0 as shown in the graph of FIG. 14.

[Modification 2 of Q-Value Measurement]

In Modification 2, the processing section in the Q-value measurement circuit 30 obtains the Q value using a ratio between a real part and an imaginary part of the impedance of a resonant circuit. In Modification 2, the real part and the imaginary part of the impedance are obtained using a self-balancing bridge circuit and a vector ratio detector.

Figure 15:
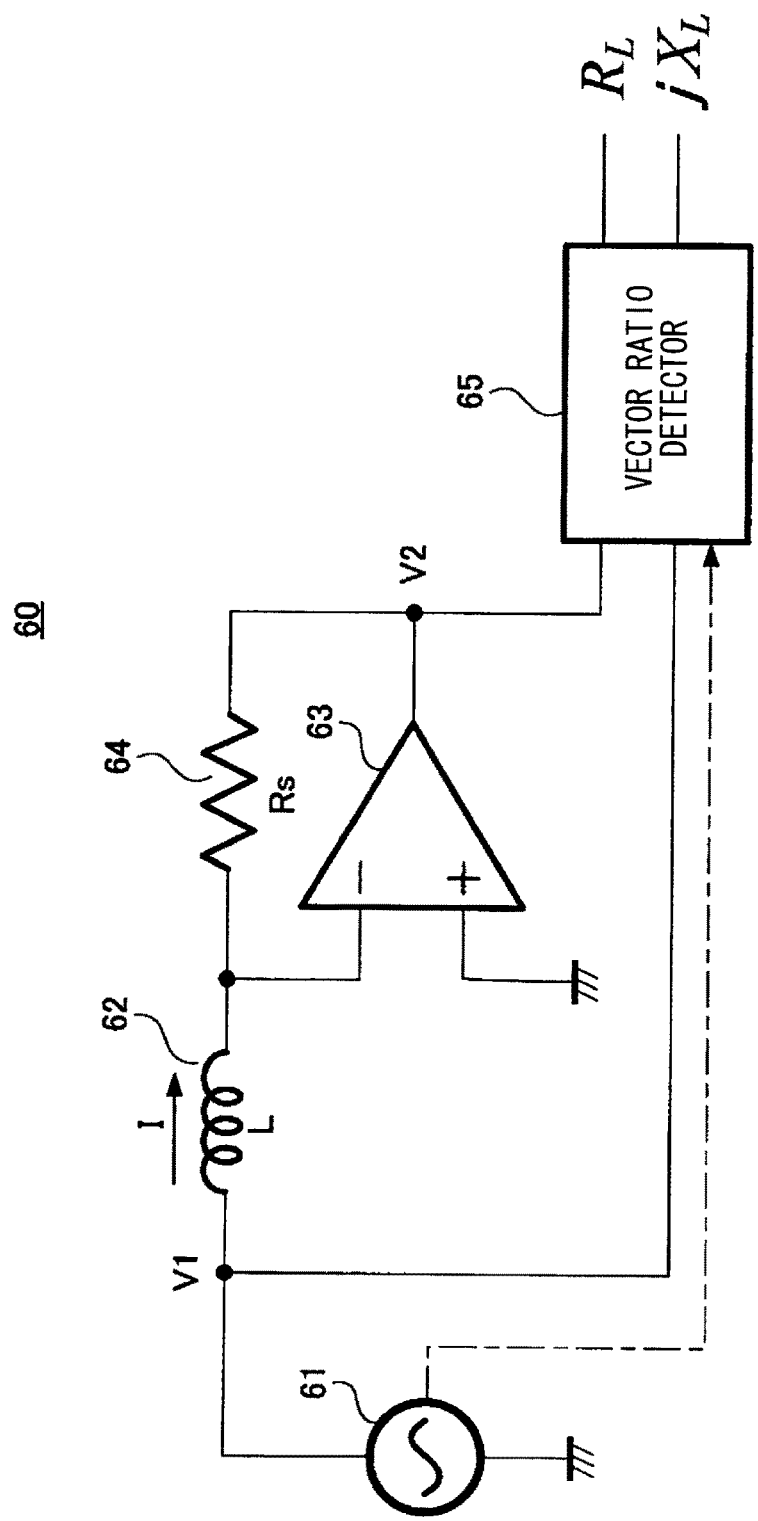
FIG. 15 is a circuit diagram for Q-value calculation using a ratio between real and imaginary parts of impedance.

FIG. 15 is a circuit diagram of a self-balancing bridge for calculation of a Q value using a ratio between the real part and the imaginary part of the impedance according to Modification 2.

A self-balancing bridge circuit 60 of FIG. 15 is configured similarly to a well-known general inverting amplifier circuit. In an inverting amplifier 63, an inverting input terminal (−) is connected with a coil 62, and a noninverting input terminal (+) is connected to the ground. Using a feedback resistance element 64, the negative feedback is used to the inverting input terminal (−) from the output terminal of the inverting amplifier 63. The vector ratio detector 65 is provided with the output (voltage V1) of an AC power source 61 that inputs AC signals to the coil 62, and the output (voltage V2) of the inverting amplifier 63. The coil 62 corresponds to the Q-value measurement coil 28 of FIG. 1.

This self-balancing bridge circuit 60 operates to zero the voltage of the inverting input terminal (−) at all times by the use of the negative feedback. The current flowing to the coil 62 from the AC power supply 61 flows almost entirely to the feedback resistance element 64 due to the high input impedance of the inverting amplifier 63. As a result, the voltage applied to the coil 62 is of the same level as the voltage V1 of the AC power supply 61, and the output voltage from the inverting amplifier 63 is the product of a current I flowing through the coil 62 and a feedback resistance value Rs. This feedback resistance value Rs is a known reference resistance value. This means that impedance is obtained by a ratio between the detected voltages V1 and V2. The vector ratio detector 65 obtains the voltages V1 and V2 in complex numbers, and thus uses phase information (alternate long and short dashed lines) about the AC power supply 61.

In Modification 2, using the self-balancing bridge circuit 60, the vector ratio detector 65, and others as such, a Q value is calculated using a ratio between a real part $R_L$ and an imaginary part $X_L$ of impedance $Z_L$ in a resonant circuit. Expressions (6) and (7) below are those representing the process of the Q-value calculation.

$$Z_L = R_L + jX_L = \frac{V1}{I} = \frac{V1}{V2} Rs \quad (6)$$

$$Q = \frac{X_L}{R_L} \quad (7)$$

The series of processes in one embodiment described above are executable by hardware, but is also executable by software. When these processes are executed by software, used is a computer in which a program of the software is installed in hardware specifically designed therefor, or a computer in which any program for implementing various functions is installed. As an example, a program of any desired software may be installed in a general-purpose personal computer for running.

Alternatively, the system or the device may be provided with a recording medium recorded with program codes of software implementing the functions in the embodiments described above. Needless to say, the functions in the embodiments are to be implemented by a computer of the system or the device (or a control device such as CPU) reading and running the program codes stored in the recording medium.

The recording medium for a supply of the program codes as such is exemplified by a flexible disk, a hard disk, an optical disk, a magneto-optical disk, a CD-ROM (Compact Disk-Read Only Memory), a CD-R (Compact Disk-Recordable), a magnetic tape, a nonvolatile memory card, and a ROM (Read-Only Memory).

Moreover, by running the program codes read by the computer, the functions in the embodiments described above are implemented. In addition, based on the description of the program codes, the OS (Operating System) or others running on the computer is in charge of the actual processes partially or entirely. The case of implementing the functions in the embodiments described above by the processes is also included.

Further, in the description, the processing step of time-sequence processing includes not only surely the processing to be performed in the specified time sequence order but also the processing to be performed not necessarily in time sequence but also in parallel or individually (parallel processing or object processing).

As such, the present disclosure is not restrictive to the embodiments described above, and numerous other modifications and variations may be possibly devised without departing from the scope of the claims of the present disclosure.

To be specific, the embodiments described above are specific examples preferable for the present disclosure, and thus are with various restrictions that are considered technically preferable. However, the technical scope of the present disclosure is not restricted to such embodiments unless it is specified to be restrictive in the descriptions. For example, the materials for use and the amount thereof, the processing time, the processing order, the numerical condition of parameters, and others in the descriptions are merely preferable examples, and the dimension, the shape, and the arrangement relationship in the drawings referred to are also schematic.

It is possible to achieve at least the following configurations from the above-described example embodiments and the modifications of the disclosure.

(1) An energy receiver including:
a power reception coil configured to receive power from a power transmission coil using a first alternating-current signal having a first frequency; and
a Q-value measurement circuit configured to detect a foreign object within a range of the power reception coil using a second alternating-current signal having a second frequency that is different than the first frequency.

(2) The energy receiver of (1), wherein the detection section is configured to measure a Q value of the circuit and detect a state of electromagnetic coupling to the power reception coil.

(3) The energy receiver of (2), wherein,
the power transmission coil is configured for use in a contactless power feed, and
the power transmission coil is different than the power reception coil.

(4) The energy receiver of (3), wherein the detection section is configured to detect whether a conductor or a circuit including an arbitrary coil is within a proximity to the power reception coil.

(5) The energy receiver of (4), wherein the detection section includes (i) a processing section configured to obtain a first voltage applied between the coil and a capacitor in a resonant circuit and a second voltage applied at both ends of the coil, the processing section configured to calculate the Q value using a ratio between the first voltage and the second voltage, and (ii) a determination section configured to compare the Q value calculated by the processing section with a threshold value set based on a Q value measured when the conductor or the arbitrary coil is not in the proximity to the power reception coil to permit the state of the electromagnetic coupling to be determined.

(6) The energy receiver of (4), further including:
a processing section configured to calculate the Q value using a half-bandwidth method of obtaining a Q value using a band in which an impedance is $\sqrt{2}$ times of an absolute value of an impedance at a resonant frequency of a series resonant circuit including the coil and a capacitor; and
a determination section configured to compare the Q value calculated by the processing section with a threshold value set based on a Q value measured when the conductor or the arbitrary coil is not in the proximity to the power reception coil to permit the state of the electromagnetic coupling to be determined.

(7) The energy receiver of (4), further including:
a processing section configured to calculate the Q value using a half-bandwidth method of obtaining a Q value using a band in which an impedance is $1/\sqrt{2}$ times of an absolute value of an impedance at a resonant frequency of a parallel resonant circuit including the coil and a capacitor; and
a determination section configured to compare the Q value calculated by the processing section with a threshold value set based on a Q value measured when the conductor or the arbitrary coil is not the proximity to the power reception coil to permit the state of the electromagnetic coupling to be determined.

(8) The energy receiver of (4), further including:
a processing section configured to obtain a real part and an imaginary part of an impedance of a resonant circuit including the coil using a self-balancing bridge circuit and a vector ratio detector, the processing section configured to calculate the Q value using a ratio therebetween; and
a determination section configured to compare the Q value calculated by the processing section with a threshold value set based on a Q value measured in advance when the conductor or the arbitrary coil is not in the proximity to the power reception coil to permit the state of the electromagnetic coupling to be determined.

(9) The energy receiver of (2), further including:
a tap connected to the power reception coil and configured for use in a contactless power feed.

(10) The energy receiver of (2), wherein,
the power reception coil is configured for measuring the Q value and as a feeding coil in a contactless power feed, and
a capacitance of a capacitor in a circuit used in the power feed is different from a capacitance of a capacitor in a circuit used in the measurement of the Q value.

(11) The energy receiver of (1), wherein the detection section is configured to measure a Q value of a circuit including the power reception coil during power feed.

(12) A power reception device, including:
a power reception coil configured to receive power from an external power source;
a power reception section configured to receive an alternating-current signal via the power reception coil;
a coil electromagnetically coupled with the external power source; and
a detection section connected to a circuit including the coil, the detection section configured to measure a Q value of the circuit using an alternating-current signal at a frequency different from a frequency of an alternating-current signal received by the power reception section.

(13) The energy receiver of (1), wherein the Q-value measurement circuit includes a capacitor connected to a Q-value measurement coil to form a resonant circuit, a capacitance value of the capacitor and an inductance value of the Q-value measurement coil being adjustable to a desired resonance.

(14) The energy receiver of (1), wherein the power reception coil includes a tap connected to (i) a first input of the Q-value measurement circuit via a capacitor and (ii) a second input of the Q-value measurement circuit, the tap configured to measure Q value.

(15) The energy receiver of (1), wherein an end portion of the power reception coil is connected to (i) a first input of the Q-value measurement circuit via a capacitor and (ii) a second input of the Q-value measurement circuit, the power reception coil configured to measure Q value.

(16) A detection method including:
transmitting power from a power transmission coil to a power reception coil using a first alternating-current signal having a first frequency;
detecting a foreign object within a range of the power reception coil using a second alternating-current signal having a second frequency that is different than the first frequency.

(17) The detection method of (16), wherein the detecting of the foreign object is performed at least in part by using a Q-value measurement circuit to measure a Q value.

(18) The detection method of (17), wherein the Q-value measurement circuit includes a capacitor connected to a Q-value measurement coil to form a resonant circuit.

(19) The detection method of (18), wherein the Q value is based on (i) a first voltage between the capacitor and the Q-value measurement coil, and (ii) a second voltage of the Q-value measurement coil.

(20) The detection method of (18), wherein the Q value is based on a ratio obtained using a bridge circuit and a vector ratio detector.

(21) The detection method of (18), further including:
adjusting a capacitance value of the capacitor and an inductance value of the Q-value measurement coil to a desired resonance.

(22) The detection method of (17), wherein the power reception coil includes a tap connected to (i) a first input of the measurement circuit via a capacitor and (ii) a second input of the measurement circuit, the tap configured to measure the Q value.

(23) The detection method of (17), further including:
storing the Q-value measurement having a largest Q value in a memory as a threshold value.

(24) The detection method of (16), further including:
executing a termination process if the foreign object is within the range of the power reception coil, the termination process causing the power transmission coil to stop transmitting power or the power reception coil to stop receiving power.

(25) A power transmission system including:
a power transmitter configured to wirelessly couple with a power receiver and transmit power to the power receiver using a first alternating-current signal having a first frequency; and
a Q-value measurement circuit configured to detect a foreign object between the power transmitter and the power receiver using a second alternating-current signal having a second frequency that is different than the first frequency.

(26) The system of (25), wherein the Q-value measurement circuit includes a capacitor connected to a Q-value measurement coil to form a resonant circuit, a capacitance value of the capacitor and an inductance value of the Q-value measurement coil being adjustable to a desired resonance.

(27) The system of (25), wherein the power receiver includes a power reception coil having a tap connected to (i) a first input of the Q-value measurement circuit via a capacitor and (ii) a second input of the Q-value measurement circuit, the tap configured to measure Q value.

(28) The system of (25), further wherein the power receiver includes a power storage section configured to store power received from the power transmitter.

(29) An energy transmitter including:
a power transmission coil configured to wirelessly transmit power to a power receiver using a first alternating-current signal having a first frequency; and
a detection section configured to detect a foreign object within a range of the power transmission coil using a second alternating-current signal having a second frequency that is different than the first frequency.

(30) The energy transmitter of (29), wherein the detection section includes a Q-value measurement circuit having a capacitor connected to a Q-value measurement coil to form a resonant circuit, a capacitance value of the capacitor and an inductance value of the Q-value measurement coil being adjustable to a desired resonance.

(31) The energy transmitter of (29), wherein the power receiver includes a power reception coil with a tap connected to (i) a first input of the Q-value measurement circuit via a capacitor and (ii) a second input of the Q-value measurement circuit, the tap configured to measure Q value.

(32) A detection device including:
a detection section connected to a circuit including a coil, the detection section configured to detect a state of electromagnetic coupling to the coil.

(33) The detection device of (32), wherein the detection section is configured to measure a Q value of the circuit.

(34) The detection device of (33), further including:
a power transmission coil configured for use in a contactless power feed.

(35) The detection device of (32), wherein the detection section is configured to detect whether a conductor or a circuit including an arbitrary coil is within a proximity to the coil.

(36) The detection device of (33), wherein the detection section includes (i) a processing section configured to obtain a first voltage applied between the coil and a capacitor in a resonant circuit and a second voltage applied at both ends of the coil, the processing section configured to calculate the Q value using a ratio between the first voltage and the second voltage, and (ii) a determination section configured to compare the Q value calculated by the processing section with a threshold value set based on a Q value measured when the conductor or the arbitrary coil is not in the proximity to the coil to permit the state of the electromagnetic coupling to be determined.

(37) The detection device of (33), further including:
a processing section configured to calculate the Q value using a half-bandwidth method of obtaining a Q value using a band in which an impedance is $\sqrt{2}$ times of an absolute value of an impedance at a resonant frequency of a series resonant circuit including the coil and a capacitor; and
a determination section configured to compare the Q value calculated by the processing section with a threshold value set based on a Q value measured when the conductor or the arbitrary coil is not in the proximity to the coil to permit the state of the electromagnetic coupling to be determined.

(38) The detection device of (33), further including:
a processing section configured to calculate the Q value using a half-bandwidth method of obtaining a Q value using a band in which an impedance is $1/\sqrt{2}$ times of an absolute value of an impedance at a resonant frequency of a parallel resonant circuit including the coil and a capacitor; and
a determination section configured to compare the Q value calculated by the processing section with a threshold value set based on a Q value measured when the conductor or the arbitrary coil is not the proximity to the coil to permit the state of the electromagnetic coupling to be determined.

(39) The detection device of (33), further including:
a processing section configured to obtain a real part and an imaginary part of an impedance of a resonant circuit including the coil using a self-balancing bridge circuit and a vector ratio detector, the processing section configured to calculate the Q value using a ratio therebetween; and
a determination section configured to compare the Q value calculated by the processing section with a threshold value set based on a Q value measured in advance when the conductor or the arbitrary coil is not in the proximity to the coil to permit the state of the electromagnetic coupling to be determined.

(40) The detection device of (32), further including:
a tap connected to the coil and configured for use in a contactless power feed.

(41) The detection device of (33), wherein,
the coil is configured for measuring the Q value and as a feeding coil in a contactless power feed, and
a capacitance of a capacitor in a circuit used in a contactless power feed is different from a capacitance of a capacitor in a circuit used in the measurement of the Q value.

(42) The detection device of (31), wherein the detection section is configured to measure a Q value of a circuit including the power reception coil during a power feed.

(A) A detection device, including:
a coil being electromagnetically coupled with an outside; and
a detection section being connected to a circuit including the coil, the detection section measuring a Q value of the circuit using an alternating-current signal at a frequency different from a frequency of an alternating-current signal of contactless power feed.

(B) The detection device according (A), wherein
the detection section measures the Q value of the circuit and detects a state of electromagnetic coupling between the coil and the outside.

(C) The detection device according to (B), further including:
a feeding coil being used in the contactless power feed, wherein the coil being used in the measurement of the Q value is different from the feeding coil.

(D) The detection device according to any one of (A) to (C), wherein
the detection section detects whether a conductor or a circuit including an arbitrary coil exists in vicinity of the coil as the state of the electromagnetic coupling with the outside.

(E) The detection device according to any one of (A) to (D), wherein
the detection section includes
a processing section obtaining a first voltage applied between the coil and a capacitor in a resonant circuit, and a second voltage applied at both ends of the coil, the processing section calculating the Q value using a ratio between the first voltage and the second voltage, and
a determination section comparing the Q value calculated by the processing section with a threshold value set based on a Q value measured in advance when the conductor or the arbitrary coil does not exist in the vicinity of the coil to allow the state of the electromagnetic coupling with the outside to be determined.

(F) The detection device according to any one of (A) to (D), further including:
a processing section calculating the Q value using a half-bandwidth method of obtaining a Q value using a band in which an impedance is $\sqrt{2}$ times of an absolute value of an impedance at a resonant frequency of a series resonant circuit including the coil and a capacitor; and
a determination section comparing the Q value calculated by the processing section with a threshold value set based on a Q value measured in advance when the conductor or the arbitrary coil does not exist in the vicinity of the coil to allow the state of the electromagnetic coupling with the outside to be determined.

(G) The detection device according to any one of (A) to (D), further including:
a processing section calculating the Q value using a half-bandwidth method of obtaining a Q value using a band in which an impedance is $1/\sqrt{2}$ times of an absolute value of an impedance at a resonant frequency of a parallel resonant circuit including the coil and a capacitor; and
a determination section comparing the Q value calculated by the processing section with a threshold value set based on a Q value measured in advance when the conductor or the arbitrary coil does not exist in the vicinity of the coil to allow the state of the electromagnetic coupling with the outside to be determined.

(H) The detection device according to any one of (A) to (D), further including:
a processing section obtaining a real part and an imaginary part of an impedance of a resonant circuit including the coil using a self-balancing bridge circuit and a vector ratio detector, the processing section calculating the Q value using a ratio therebetween; and
a determination section comparing the Q value calculated by the processing section with a threshold value set based on a Q value measured in advance when the conductor or the arbitrary coil does not exist in the vicinity of the coil to allow the state of the electromagnetic coupling with the outside to be determined.

(I) The detection device according to (B), further including:
a tap-provided feeding coil being used in the contactless power feed, wherein
the coil being used in the measurement of the Q value is a part of the feeding coil divided by the tap.

(J) The detection device according to (B), wherein
the coil being used in the measurement of the Q value is used commonly as a feeding coil being used in the contactless power feed, and
a capacitance of a capacitor in a circuit used in power feed is different from a capacitance of a capacitor in a circuit used in the measurement of the Q value.

(K) The detection device according to any one of (A) to (J), wherein
the detection section measures the Q value of the circuit including the coil during power feed.

(L) A power reception device, including:
a power reception coil being in power reception from an outside;
a power reception section receiving an alternating-current signal via the power reception coil;
a coil being electromagnetically coupled with an outside; and
a detection section being connected to a circuit including the coil, the detection section measuring a Q value of the circuit using an alternating-current signal at a frequency different from a frequency of an alternating-current signal received by the power reception section.

(M) A power transmission device, including:
a power transmission coil being used in contactless power transmission;
a power transmission section supplying an alternating-current signal to the power transmission coil;
a coil being electromagnetically coupled with an outside; and
a detection section being connected to a circuit including the coil, the detection section measuring a Q value of the circuit using an alternating-current signal at a frequency different from a frequency of the alternating-current signal provided by the power transmission section.

(N) A contactless power transmission system, including:
a power transmission device transmitting power wirelessly; and
a power reception device receiving the power from the power transmission device, wherein the power transmission device or the power reception device, or both include
  a feeding coil being used in contactless power feed,
  a coil being electromagnetically coupled with an outside, and
  a detection section being connected to a circuit including the coil, the detection section measuring a Q value of the circuit using an alternating-current signal at a frequency different from a frequency of an alternating-current signal flowing to the feeding coil.

(O) A detection method, including:
measuring, with a detection section connected to a circuit including a coil electromagnetically coupled with an outside, a Q value of the circuit using an alternating-current signal at a frequency different from a frequency of an alternating-current signal flowing to a feeding coil.

As used herein, the terms "energy receiver" and "power reception device" may be used interchangeably. The terms "power transmission system" and "contactless power transmission system" may be used interchangeably. The terms "energy transmitter" and "power transmission device" may be used interchangeably.

The present disclosure contains subject matter related to that disclosed in Japanese Priority Patent Application JP 2011-160186 filed in the Japan Patent Office on Jul. 21, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An energy receiver, comprising:
  a power reception coil configured to receive power from a power transmission coil by use of a first alternating-current signal which has a first frequency; and
  a detection section configured to detect a foreign object within a range of the power reception coil by use of a second alternating-current signal which has a second frequency that is different than the first frequency.

2. The energy receiver of claim 1, wherein the detection section is configured to measure a Q value of a first circuit and detect a state of electromagnetic coupling to the power reception coil.

3. The energy receiver of claim 2, wherein,
  the power transmission coil is configured for use in a contactless power feed, and
  the power transmission coil is different than the power reception coil.

4. The energy receiver of claim 2, wherein,
  the power reception coil is configured for measurement of the Q value and configured as a feeding coil in a contactless power feed, and
  a capacitance of a capacitor in a second circuit used in the power feed is different from a capacitance of a capacitor in the first circuit used in the measurement of the Q value.

5. The energy receiver of claim 1, wherein the detection section is configured to measure a Q value of a circuit which includes the power reception coil during power feed.

6. The energy receiver of claim 1, wherein the detection section includes a capacitor connected to a Q-value measurement coil to form a resonant circuit, a capacitance value of the capacitor and an inductance value of the Q-value measurement coil being adjustable to a desired resonance.

7. A detection method, comprising:
  transmitting power from a power transmission coil to a power reception coil using a first alternating-current signal having a first frequency; and
  detecting a foreign object within a range of the power reception coil using a second alternating-current signal having a second frequency that is different than the first frequency.

8. A power transmission system, comprising:
  a power transmitter configured to wirelessly couple with a power receiver and transmit power to the power receiver by use of a first alternating-current signal which has a first frequency; and
  a Q-value measurement circuit configured to detect a foreign object between the power transmitter and the power receiver by use of a second alternating-current signal which has a second frequency that is different than the first frequency.

9. An energy transmitter, comprising:
  a power transmission coil configured to wirelessly transmit power to a power receiver by use of a first alternating-current signal which has a first frequency; and
  a detection section configured to detect a foreign object within a range of the power transmission coil by use of a second alternating-current signal which has having a second frequency that is different than the first frequency.

10. A detection device, comprising:
  a detection section connected to a first circuit which includes a coil, the detection section configured to detect a foreign object within a range of the coil by use of a first alternating-current signal at a first frequency which is different from a second frequency of a second alternating-current signal of a contactless power feed; and
  a tap connected to the coil and configured for use in the contactless power feed.

11. The detection device of claim 10, wherein the detection section is configured to measure a Q value of the first circuit.

12. The detection device of claim 11, further comprising:
  a power transmission coil configured for use in the contactless power feed.

13. The detection device of claim 10, wherein the detection section is configured to detect whether a conductor or a circuit which includes an arbitrary coil is within a proximity to the coil.

14. The detection device of claim 11, wherein the detection section includes (i) a processing section configured to obtain a first voltage applied between the coil and a capacitor in a resonant circuit and a second voltage applied at both ends of the coil, the processing section is configured to calculate the Q value by use of a ratio between the first voltage and the second voltage, and (ii) a determination section configured to compare the Q value calculated by the processing section with a threshold value set based on a Q value measured based on a determination that a conductor or an arbitrary coil is not in the proximity to the coil to permit a state of the electromagnetic coupling to be determined.

15. The detection device of claim 11, further comprising:
  a processing section configured to calculate the Q value by a half-bandwidth process which obtains a Q value by a band in which an impedance is $\sqrt{2}$ times of an absolute value of an impedance at a resonant frequency of a series resonant circuit which includes the coil and a capacitor; and a determination section configured to compare the Q value calculated by the processing section with a threshold value set based on a Q value measured based on a determination that a conductor or an arbitrary coil is not in the proximity to the coil to permit a state of the electromagnetic coupling to be determined.

16. The detection device of claim 11, further comprising:
a processing section configured to calculate the Q value by a half-bandwidth process which obtains a Q value by a band in which an impedance is $1/\sqrt{2}$ times of an absolute value of an impedance at a resonant frequency of a parallel resonant circuit which includes the coil and a capacitor; and
a determination section configured to compare the Q value calculated by the processing section with a threshold value set based on a Q value measured based on a determination that a conductor or an arbitrary coil is not in the proximity to the coil to permit a state of the electromagnetic coupling to be determined.

17. The detection device of claim 11, further comprising:
a processing section configured to obtain a real part and an imaginary part of an impedance of a resonant circuit which includes the coil by use of a self-balancing bridge circuit and a vector ratio detector, the processing section is configured to calculate the Q value by use of a ratio therebetween; and
a determination section configured to compare the Q value calculated by the processing section with a threshold value set based on a Q value measured in advance based on a determination that a conductor or an arbitrary coil is not in the proximity to the coil to permit a state of the electromagnetic coupling to be determined.

18. The detection device of claim 11, wherein,
the coil is configured for measurement of the Q value and configured as a feeding coil in the contactless power feed, and
a capacitance of a capacitor in a second circuit used in the contactless power feed is different from a capacitance of a capacitor in the first circuit used in the measurement of the Q value.

19. The detection device of claim 10, wherein the detection section is configured to measure a Q value of a circuit which includes the power reception coil during a power feed.

* * * * *